(12) United States Patent
Beach et al.

(10) Patent No.: US 10,459,453 B2
(45) Date of Patent: Oct. 29, 2019

(54) AUTONOMOUS VEHICLES AND METHODS OF ZONE DRIVING

(71) Applicant: Cybernet Systems Corp., Ann Arbor, MI (US)

(72) Inventors: Glenn Beach, Grass Lake, MI (US); Douglas Haanpaa, Ann Arbor, MI (US); Charles J. Jacobus, Ann Arbor, MI (US); Steven Rowe, Grass Lake, MI (US)

(*) Notice: Subject to any disclaimer, the term of this patent is extended or adjusted under 35 U.S.C. 154(b) by 0 days.

(21) Appl. No.: 15/806,844

(22) Filed: Nov. 8, 2017

(65) Prior Publication Data
US 2018/0129220 A1 May 10, 2018

Related U.S. Application Data

(60) Provisional application No. 62/419,308, filed on Nov. 8, 2016.

(51) Int. Cl.
G05D 1/00 (2006.01)
G05D 1/02 (2006.01)
B66F 9/06 (2006.01)

(52) U.S. Cl.
CPC .......... *G05D 1/0274* (2013.01); *B66F 9/063* (2013.01); *G05D 1/0088* (2013.01);
(Continued)

(58) Field of Classification Search
CPC .. G05D 1/0274; G05D 1/0088; G05D 1/0225; G05D 1/0246; G05D 1/0276; G05D 1/0278; B66F 9/063
(Continued)

(56) References Cited

U.S. PATENT DOCUMENTS 8,509,982 B2 * 8/2013 Montemerlo ........... G06T 7/223
701/26
8,965,561 B2 2/2015 Jacobus et al.
(Continued)

OTHER PUBLICATIONS

King-Hele, D., "Erasmus Darwin's Improved Design for Steering Carriages and Cars," *Notes and Records of the Royal Society of London*, vol. 56, No. 1, Jan. 2002, pp. 41-62; Originally patented in England in 1818.
(Continued)

*Primary Examiner* — Gertrude Arthur Jeanglaude
(74) *Attorney, Agent, or Firm* — John G. Posa; Belzer PC

(57) ABSTRACT

Autonomous vehicles are capable of executing missions that abide by on-street rules or regulations, while also being able to seamlessly transition to and from "zones," including off-street zones, with their our set(s) of rules or regulations. An on-board memory stores roadgraph information. An on-board computer is operative to execute commanded driving missions using the roadgraph information, including missions with one or more zones, each zone being defined by a sub-roadgraph with its own set of zone-specific driving rules and parameters. A mission may be coordinated with one or more payload operations, including zone with "free drive paths" as in a warehouse facility with loading and unloading zones to pick up payloads and place them down, or zone staging or entry points to one or more points of payload acquisition or placement. The vehicle may be a warehousing vehicle such as a forklift.

19 Claims, 7 Drawing Sheets

(52) U.S. Cl.
CPC ......... *G05D 1/0225* (2013.01); *G05D 1/0246* (2013.01); *G05D 1/0276* (2013.01); *G05D 1/0278* (2013.01)

(58) Field of Classification Search
USPC .......................................................... 701/23
See application file for complete search history.

(56) References Cited

U.S. PATENT DOCUMENTS

| | | | |
|---|---|---|---|
| 9,989,967 | B2 | 6/2018 | Jacobus et al. |
| RE47,108 | E | 10/2018 | Jacobus et al. |
| 2008/0027591 | A1* | 1/2008 | Lenser ................. G05D 1/0251 701/2 |
| 2009/0079839 | A1* | 3/2009 | Fischer ................... G01S 7/003 348/218.1 |
| 2018/0089616 | A1 | 3/2018 | Jacobus et al. |
| 2019/0088148 | A1 | 3/2019 | Jacobus et al. |

OTHER PUBLICATIONS

Lozowy, D., "Inventor of the Tractor," Citation http://ricolor.org/history/eng/blinov. Patented in US in 1913 by B. Holt, U.S. Pat. No. 1,076,678. Citation only, http://en.wikipedia.org/wiki/Benjamin_Holt.

Dickmanns, E.D. et al., "Guiding Land Vehicles Along Roadways by Computer Vision," *Congres Automatique (1985: Toulouse, France). The Tools for tomorrow*, 1985; Overview of Dickmann's early work in automated driving.

Lowrie, J.W. et al. "The Autonomous Land Vehicle (ALN) Preliminary Road-following Demonstration," *Proc. SPIE*, vol. 579, 1985. Overview of the entire ALV includes elements from JADI disclosure. Martin-Marietta (prime contractor) view.

Kanade, T. et al., "Autonomous Land Vehicle Project at CMU," *Proceedings of the 1986 ACM Fourteenth Annual Conference on Computer Science*. ACM, 1986. Overview of the entire ALV includes elements from JADI disclosure. CMU view. Includes Ladar stuff.

Shafer, S. et al., "An Architecture for Sensor Fusion in a Mobile Robot," *Robotics and Automation, Proceedings, 1986 IEEE International Conference on*. vol. 3. IEEE, 1986.

Furmans, K. et al., "Plug-and-Work Material Handling Systems," *2010 International Material Handling Research Colloquium, Milwaukee, USA*. 2010.

Correa, A. et al., "Multimodal Interaction with an Autonomous Forklift," *Human-Robot Interaction (HRI), 2010 5th ACM/IEEE International Conference on*. IEEE, 2010.

Cui, G. et al., "A Robust Autonomous Mobile Forkift Pallet Recognition," *Informatics in Control, Automation and Robotics (CAR), 2010 2nd International Asia Conference on*. vol. 3, IEEE, 2010.

Walter, M. et al., "Closed-loop Pallet Engagement in an Unstructured Environment," Proceedings of the IEEE International Conference on Robotics and Automation (ICRA) Workshop on Mobile Manipulation, Anchorage, Alaska, May 2010.

Karaman, S. et al., "Anytime Motion Planning Using the RRT*," *Robotics and Automation (ICRA), 2011 IEEE International Conference on*. IEEE, 2011.

Kollar, T. et al., "Towards Understanding Hierarchical Natural Language Commands for Robotic Navigation and Manipulation," MIT-CSAIL-TR-2011-007. Feb. 1, 2011.

Song, Y. et al., "Implementation of Distributed Architecture Based on CAN Networks for Unmanned Forklift," *IECON 2011—37th Annual Conference on IEEE Industrial Electronics Society*. IEEE, 2011.

Widytriatmo, A. et al., "Navigation Function-based Control of Multiple Wheeled Vehicles," *Industrial Electronics, IEEE Transactions on* 58.5 (2011), 1896-1906.

Widyotriatmo, A. et al., "Control Architecture of Material Handling Vehicles," *Instrumentation Control and Automation (ICA), 2011 2nd International Conference on*. IEEE, 2011.

"ARToolKit is a Software Library for Building Augmented Reality (AR) applications," Human Interface Technology Laboratory (HIT Lab) at the University of Washington, http://www.hitl.washington.edu/artoolkit/ Dec. 25, 2012.

Long, P., "Determining Position and Orientation of Pallet Used for Controlling Autonomous Forklift in Warehouse Automation," Journal of Computer Science and Cybernetics 26.3 (2012): 267-277.

Gage, D.W. "UGV History 101: A Brief History of Unmanned Ground Vehicle (UGV) Development Efforts," Special Issue on Unmanned Ground Vehicles, Unmanned Systems Magazine, vol. 13, No. 3, Summer 1995.

Lecking, D. et al., "The RTS-STILL Robotic Fork-Lift," EURON Technology Transfer Award.

Nasr, H. et al., "Guiding an Autonomous Land Vehicle Using Knowledge-based Landmark Recognition," *Proceedings of the DARPA image Understanding Workshop*, 1987.

Turk, M. et al., "Video Road-following for the Autonomous Land Vehicle," *Robotics and Automation. Proceedings, 1987 IEEE international Conference on*. vol. 4. IEEE, 1987. Overview of automated driving for ALV.

Waxman, A. et al., "A Visual Navigation System for Autonomous Land Vehicles," *Robotics and Automation, IEEE Journal of* 3.2 (1987): 124-141. Overview of automated-driving for ALV.

Asada, M., "Building a 3D World Model for Mobile Robot from Sensory Data," *Robotics and Automation, 1988. Proceedings., 1988 IEEE international Conference on*. IEEE, 1988.

Daily, M. et al., "Autonomous Cross-country Navigation with the ALV," Robotics and Automation, 1988. Proceedings., 1988 IEEE international Conference on. IEEE, 1988. Includes LADAR Stuff.

Dickmanns, E. et al., "Autonomous High Speed Road Vehicle Guidance by Computer Vision," International Federation of Automatic Control, World Congress (10th). Automatic control: World Congress, vol. 1, 1988. Overview of Dickmann's early work in automated driving.

Dunlay, R., "Obstacle Avoidance Perception Processing for the Autonomous Land Vehicle," Robotics and Automation, 1988. Proceedings., 1988 IEEE International conference on. IEEE, 1988.

Turk, M. et al., "VITS—A Vision System for Autonomous Land Vehicle Navigation." Pattern Analysis and Machine Intelligence, IEEE Transactions on 10.3 (1988): 342-361.

Everett, H.R. et al., "Survey of Collision Avoidance and Ranging Sensors for Mobile Robots. Revision 1," No. NCCOSC/RDT/E-1194-REV-1. Naval Command Control and Ocean Surveillance Center RDT an E Div San Diego CA, 1992.

Chun, W. et al., "Unmanned Ground Vehicle Demo II: Demonstration A," Photonics for Industrial Applications, International Society for Optics and Photonics, 1995.

Carmer, D. et al., "Laser, Radar in Robotics," Proceedings of the IEEE 84.2 (1996): 299-320.

Garibotto, G. et al., "Computer Vision Control of an Intelligent Forklift Truck," Intelligent Transportation System, 1997. ITSC'97., IEEE Conference on. IEEE, 1997.

Larsen, T. et al., "Location Estimation for an Autonomously Guided Vehicle Using an Augmented Kalman Filter to Autocalibrate the Odometry," FUSION98 Spie Conference, 1998.

Garibotto, G. et al., "Industrial Exploitation of Computer Vision in Logistic Automation: Autonomous Control of an Intelligent Forklift Truck," *Robotics and Automation, 1998. Proceedings. 1998 IEEE International Conference on.* vol. 2. IEEE, 1998.

Kelly, A. et al., "Rough Terrain Autonomous Mobility—part 2: An Active Vision, Predictive Control Approach," Autonomous Robots 5.2 (1998): 163-198.

Matsumara, J. et al., "Lightning Over Water: Sharpening America's Light Forces for Rapid Reaction Missions," Appendx D: Robotics: Augmenting the Soldier?, Rand Corporation Report, MR-1196-A/OSD, 0-8330-2845-6, 2000.

Pagés, J. et al., "A Computer Vision System for Autonomous Forklift Vehicles in Industrial Environments," In Proc. of the 9th Mediterranean Conference on Control and Automation MEDS. vol. 2001, 2001.

(56) References Cited

OTHER PUBLICATIONS

Pagés, J. et al., "An Accurate Pallet Pose Estimation for Guiding Autonomous Forklift Vehicles," Proc. of WESIC 2001, Univ. of Twente, The Netherlands, Jun. 27-29, 2001.
Seelinger, M. et al., "Automatic Visual Guidance of a Forklift Engaging a Pallet," Robotics and Autonomous Systems 54.12 (2006): 1026-1038.
Shoemaker, C., "Development of Autonomous Robotic Ground Vehicles: DoD's Ground Robotics Research Programs: Demo I through Demo III," Intelligent Vehicle Systems: A 4D/RCS Approach (2006): 283.
Armesto, L. et al., "Automation of Industrial Vehicles: A Vision-based Line Tracking. Application," Emerging Technologies & Factory Automation, 2009, ETFA 2009. IEEE Conference on. IEEE, 2009.
Bouguerra, A. et al., "An Autonomous Robotic System for Load Transportation," Emerging Technologies & Factory Automation, 2009. ETFA 2009. IEEE Conference on. IEEE, 2009.
Moore, D. et al., "Simultaneous Local and Global State Estimation for Robotic Navigation," Robotics and Automation, 2009. ICRA'09, IEEE International Conference on. IEEE, 2009.
Tamba, T. et al., "A Path Following Control of an Unmanned Autonomous Forklift," International Journal of Control Automation and Systems 7.1 (2009): 113-122.

\* cited by examiner

Figure 1.

```
Route Network Definition File                                    Lane 2
  Segments                                                         .
    Segment 1                                                      .
      Number of lanes NOL                                          .
      ; Speed limit added to RNDF format by the inventors        Lane NOL
        Speed Limit Min-Speed Max-Speed                        Zones
      Segment Name STREET-NAME                                   Zone Name ZONE-NAME
      Lane 1                                                     Number of spots NOS
        Width METERS                                             Perimeter
        Left boundary type (double yellow, white, broken             Exit WAYPOINT-NUMBER
              white)                                                   .
        Right boundary type (double yellow, white,                     .
              broken white)                                            .
        Checkpoint CHECKPOINT-NUMBER                                 Exit WAYPOINT-NUMBER
          .                                                          Waypoint 1 LATITUDE LONGITUDE
          .                                                          Waypoint 2 LATITUDE LONGITUDE
          .                                                            .
        Checkpoint CHECKPOINT-NUMBER                                   .
        Stop WAYPOINT-NUMBER                                           .
          .                                                          Waypoint W LATITUDE LONGITUDE
          .                                                        (Parking) Spot 1
          .                                                          Width METERS
        Stop WAYPOINT-NUMBER                                         Checkpoint CHECKPOINT-NUMBER
        Exit WAYPOINT-NUMBER                                           .
          .                                                            .
          .                                                            .
          .                                                          Checkpoint CHECKPOINT-NUMBER
        Exit WAYPOINT-NUMBER                                         Waypoint 1 LATITUDE LONGITUDE
        Waypoint 1 LATITUDE LONGITUDE                                Waypoint 2 LATITUDE LONGITUDE
        Waypoint 2 LATITUDE LONGITUDE                              (Parking) Spot 2
          .                                                            .
          .                                                            .
          .                                                            .
        Waypoint W LATITUDE LONGITUDE                              (Parking) Spot NOS
```

```
Mission Data File
  Checkpoints
    Checkpoint 1
    Checkpoint 2
       .
       .
       .
    Checkpoint N
  Speed Limits
    Segment 1  Min-Speed Max-Speed
    Segment 2  Min-Speed Max-Speed
       .
       .
    Segment M  Min-Speed Max-Speed
```

Mission (First Truck):
    Checkpoint 1
    Checkpoint 6: Pallet Engagement
    Checkpoint 4: Pallet Disengagement
    Checkpoint 1
    Checkpoint 8
End Mission (Second Truck):
    Checkpoint 3
    Checkpoint 5: Pallet Engagement
    Checkpoint 3
    Checkpoint 7
End

AUTONOMOUS VEHICLES AND METHODS OF ZONE DRIVING

REFERENCE TO RELATED APPLICATIONS

This Application claims priority to U.S. Provisional Patent Application Ser. No. 62/419,308, filed Nov. 8, 2016, the entire content of which is incorporated herein by reference.

FIELD OF THE INVENTION

This invention relates generally to golfing and, to a golf tee with a structure for consistent in-ground placement height.

BACKGROUND OF THE INVENTION

A road map or, alternatively, a roadgraph, is a graph network of information including roads, lanes, intersections, and the connections between these features. A roadgraph also typically includes a set of prescribed driving rules (speed limits, lane or road width defaults, whether turn right on red is allowed or disallowed, driving on the left or right hand sides of the roads, etc.) The roadgraph may also include one or more zones defined as areas, typically defined as a bounded polygonal area, that embody alternative driving conventions within that zone that differ from the rules defined for the roadgraph within which the zone is defined. One example is an automated tactical, or outdoor, forklift truck where, from work area to work area, the truck operates driving missions over roadways and follows normal driving rules, but at points of load pick-up or put-down, may enter a zone where alternative driving rules can be applied (for instance the truck may drive from any point to any other point without regards to lanes or right/left hand passing rules as long as no person, other vehicle, or obstacles is placed into danger of collision).

Autonomous vehicles basically traverse roadgraphs by finding and taking paths through the roadgraph from the vehicle's current location to a designated endpoint. As the graph is traversed, vehicle drive logic generates waypoints typically expressed as GPS coordinates (latitudes and longitudes) or some other equivalent location coordinates (for instance in Universal Transverse Mercator coordinates express locations as meters from an origin point). Then the vehicle drives these points, with possible small path variations to avoid obstacles, to get to the designated endpoint (or sometimes this might be called a checkpoint).

Associated with the roadgraph there may be global driving rules and parameters. In the rules of the road for the DARPA Urban Challenge [DARPA 2007 Rules] derived from California driving rules of the road, these rules included:

Rules for passing cars stopped on the road
Rules for intersection precedence (stopping and yielding to cross traffic)
Rules prohibiting passing within a specified distance from intersections
Maximum Speed limits Associated with waypoints (or checkpoints) in the roadgraph there might be specific driving rules or behaviors that are invoked as the point is approached or as it is passed. In the rules of the road for the DARPA 2007 Rules, these included:

Stopping at a stop point—also anticipating other driver behaviors at stop points in other lanes connected in the graph to this stop point (i.e. collectively defining an intersection and its specific intersection behavior)
Changing speed based on speed limits defined on a particular segment of road in the graph (i.e. limits higher or lower that the default maximum speed limit for the roadgraph)
Changes in authority to deviate from the planned path for obstacle avoidance dependent on specified lane widths for a particular road segment within the roadgraph
Lane change rules for the road segment (i.e. expressed to human drivers as yellow solid lines of white solid lines that are there to prevent lane changes)

Other rules could include whether turn right on red is allowed, whether U-turns are allowed, lane closures, special occupancy lanes (i.e. multiple occupancy lanes and perhaps in the future, autonomous vehicle lanes).

FIG. 1 shows how the DARPA roadgraph is defined [DARPA 2007 Route Network File (RNDF) and Mission Data File (MDF) Formats]. Most of the graph links the roadgraph to a series of road segments. These road segments are named, potentially have a unique speed limit, and define each lane along the road segment. The lanes are defined as a series of waypoints in GPS coordinates (but alternatively in another location defining form like UTM). Associated with each of these points can be driving rule properties like those already described. Furthermore some of the waypoints can also be defined a checkpoints that can be specified as destination locations.

Other map representations use similar encoding approaches. Ex: Google Maps codes points as KML [KeyHole Markup Language] which uses polylines to encode paths made up of compressed waypoint coding latitude, longitude and altitude. Then various properties are associated with these segments like speed limit, place names, etc. Ex: TIGER, Topologically Integrated Geographic Encoding and Referencing, was developed by the US Census Bureau and encodes path data as lines and polygons made up of latitude and longitude waypoints. Other properties are included as data blocks referencing locations or areas—how one encodes this data in a software application is left to the developer.

Note that one of the features of the DARPA graph is the definition of a zone. The idea of the DARPA zone is an area where the automated vehicle is free to drive from any zone entry point to any checkpoint defined in the zone or to a designated exit point from the zone through any path (usually the shorted path) that is free of obstacles. The DARPA zone models driving off road over an area of rugged terrain, but it are also an ideal representation for:

Parking areas
Intersections (based on intersection precedence the automated vehicle will enter the intersection expecting all other drivers to respect their own yielding protocol so that should not be any other vehicle or pedestrian in the intersection that would interfere with the autonomous vehicle, however, as we all know some people violate these precedence rules creating the possible situation in the intersection where vehicles have to maneuver around each other and pedestrians or stop so as not to collide with them—this is the basic zone driving behavior, take any path out of the zone that does not collide with another vehicle, pedestrian, or obstacle).
Construction zones (using barriers that are set-up as obstacles to guide traffic around work areas)

In U.S. Pat. No. 8,509,982, the entire content of which is incorporated herein by reference, the concept of a zone is defined as locations where diving is challenging such as merges, construction zones, or other obstacles where the automated driving system is not capable. This example is that in a zone, driving rules might require the autonomous vehicle to alert the driver that the vehicle is approaching the zone so that the driver can take control of steering, acceleration, etc. In another example they suggest that entering a zone might be associated with an automatic broadcast from the vehicle to others in the surrounding area signaling an unsafe condition.

SUMMARY OF THE INVENTION

The present invention relates to autonomous vehicles, with one distinction being that vehicles configured in accordance with the invention are capable of executing missions that abide by on-street rules or regulations, while also being able to seamlessly transition to and from "zones," including off-street zones, with their our set(s) of rules or regulations.

A driverless vehicle according to the invention includes a frame, platform or chassis with a powertrain driving a set of wheels, and further including steering and braking systems. An on-board memory stores roadgraph information, including driving rules and parameters associated with a coordinate system. A localization system determine the location of the vehicle relative to the roadgraph coordinate system, and an obstacle detection system is used to avoid structures external to the vehicle along the driving path.

An on-board computer, interfaced to the powertrain, and steering and braking subsystems is operative to execute commanded driving missions using the roadgraph information, taking advantage of the localization and obstacle detection systems. In accordance with the invention, the vehicle is further operative to execute missions including one or more zones, each zone being defined by a sub-roadgraph with its own set of zone-specific driving rules and parameters.

A mission may be coordinated with one or more payload operations, including zone with "free drive paths" as in a warehouse facility. As examples, a mission may include loading and unloading zones to pick up payloads and place them down; or a mission may take the vehicle from zone staging or entry points to one or more points of payload acquisition or placement. One or more roadgraphs may be embedded within a zone, thereby inheriting the driving rules and parameters specific to that zone.

The vehicle localization system may include GPS for latitude and longitude localization and visual sensing of environmental structures external to the vehicle, and may additionally include barcode location markers for localization overwatch indoors. The vehicle may be a warehousing vehicle such as a forklift.

BRIEF DESCRIPTION OF THE DRAWINGS

FIG. 1 shows how the DARPA roadgraph is defined [DARPA 2007 Route Network File (RNDF) and Mission Data File (MDF) Formats];

DETAILED DESCRIPTION OF THE PREFERRED EMBODIMENTS

Our definition of zone semantic is logically identical to that used by DARPA in its roadgraph definition and seems similar to that described by Google also. However, while DARPA defines a zone as an open free driving area and Google defines it as a "dangerous" area that might require passing of drive control back to the human operator, we defined the zone as a new sub roadgraph possibly with its own set of zone specific driving rules and parameters.

This more general definition encompasses the earlier forms cited. However, the definition is motivated by autonomous vehicles like tactical forklifts that move loads over short roadway segment that require obedience to regular road driving rules, but also free drive within loading and unloading zones to pick up payloads and place them down. Within these open drive zones, obstacles have to be detected and navigated around, while driving paths generated to take the vehicle from zone staging or entry points to point of payload acquisition or placement. Furthermore, in-zone operations to place the vehicle in locations must be coordinated with other payload operations like moving sensors into proper line of sight with payloads (i.e. positioning of the truck, its sensors, and its appendages to line up properly with respect to payloads), payload pick-up and put-down manipulations by forks or other manipulation appendages, and management of load centers of mass.

Figure 2:
FIG. 2 illustrates an alternative example of using the zone to change driving rules.

Another example of using the zone to change driving rules is shown in FIG. 2. In England, vehicles operate with the left hand lane rule while in Holland they operate on the right hand rule. One way to use zones is to call England a Zone of type Left and the European continent a zone of type Right. Most of the basic driving rules will be similar for each zone encompassed area but will be coded for left or right handed driving preferences respectively. This, then, identifies another property of the generalized zone. Roadgraphs can be embedded within a zone, inheriting the zone's defined default driving rules and properties. This includes embedding of smaller area zones as part of a roadgraph within the larger zone.

Figure 3:
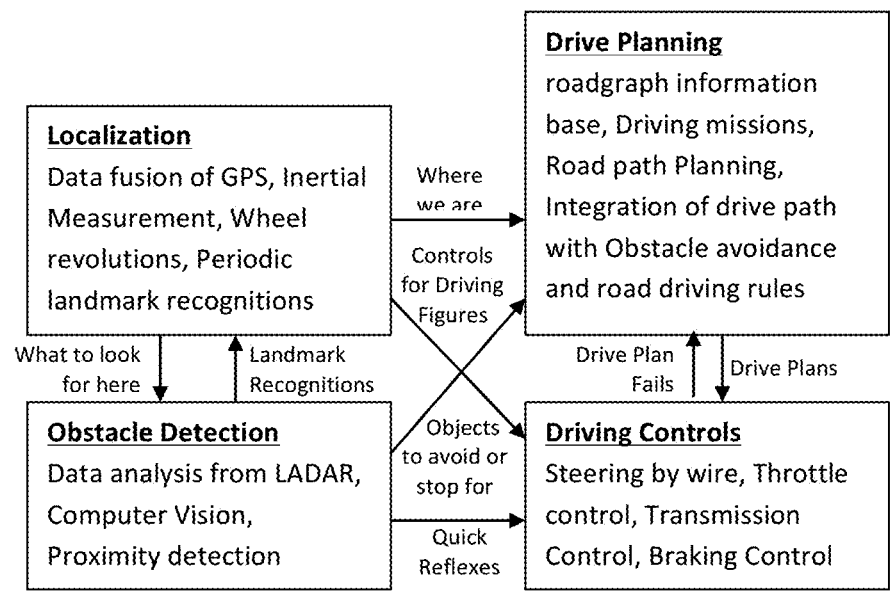
FIG. 3 depicts how the driverless roadgraph approach is typical of other DARPA Urban Challenge derived driverless vehicle control systems.

As shown in FIG. 3, the driverless roadgraph approach is typical of other DARPA Urban Challenge derived driverless vehicle control systems. It is built on four elements. The first is the vehicle localization system that always knows where the vehicle is relative to the roadgraph coordinate system to some minimum positional error. In our systems, this is accomplished by using what we call position different sensors (wheel encoders that count wheel revolutions, inertial sensor that measure gyroscoping and translational accelerations of the vehicle, which when integrated provide an estimate of orientation and location change, and magnetic compass which measures magnetic north) to provide immediate location change measurements combined with overwatch sensors (GPS measurements, visual landmarks fixed to known locations on the ground that can be detected through video or laser radar sensors) bounding the location error derived by integrating the difference sensors over time.

Driverless vehicles often depend heavily upon GPS overwatch for location detection, even to the accuracy needed for road lane keeping. Automated loaders and carriers also often employ visual sensors (video or laser radar sensors) to find and localize to visual landmarks because these sensor are also necessary to find loads that are located at an approximate location (i.e., pallets might not be placed exactly at the designated location, but only approximately there and they then have to be found so as to be acquired for transport using visual sensors).

In our systems, we employ both GPS for latitude and longitude localization, and overwatch out-of-doors and visual sensing of features like doorways, walls, hallways, and specifically constructed barcode location markers for localization overwatch indoors.

The second element of the DARPA Urban Challenge derived driverless vehicle control system is the obstacle detection, which determines how far a vehicle can move in its intended driving direction without colliding with another vehicle, pedestrian or obstruction. Obstructions of any kind are objects that may be stationary or moving that intercept the vehicle's planned driving path at a future time and are large enough or deep enough to cause damage to either the vehicle or the obstacle. The size restrictions set for size are determined so as to not hurt or destroy a obstacle over a certain size (i.e., usually set not to hurt people) and not hurt the vehicle (set by vehicle and wheel size as compared to the obstacle). Some systems apply special algorithms to further characterize objects as pedestrians or specific vehicles, but this at the current state-of-the-art is less reliable than classification by location, movement, and size.

The third element of the DARPA Urban Challenge derived driverless vehicle control system includes driving controls providing automated control over the key driving functions including steering, acceleration, braking, engine controls, and other signaling (like brake lights and turn signals). In modern vehicles this is often easily done by accessing vehicle internal control buses (for instance, CAN). On older and specialized vehicles (for instance for many loader and unloader type vehicles) it may be necessary to refit with motors, linkages, and controllers to allow automatic control actuation. These controls will be usually controlled through an interconnection bus like CAN, but can also be directly controlled through other means including digital to analog and analog to digital interfaces.

Figure 4:
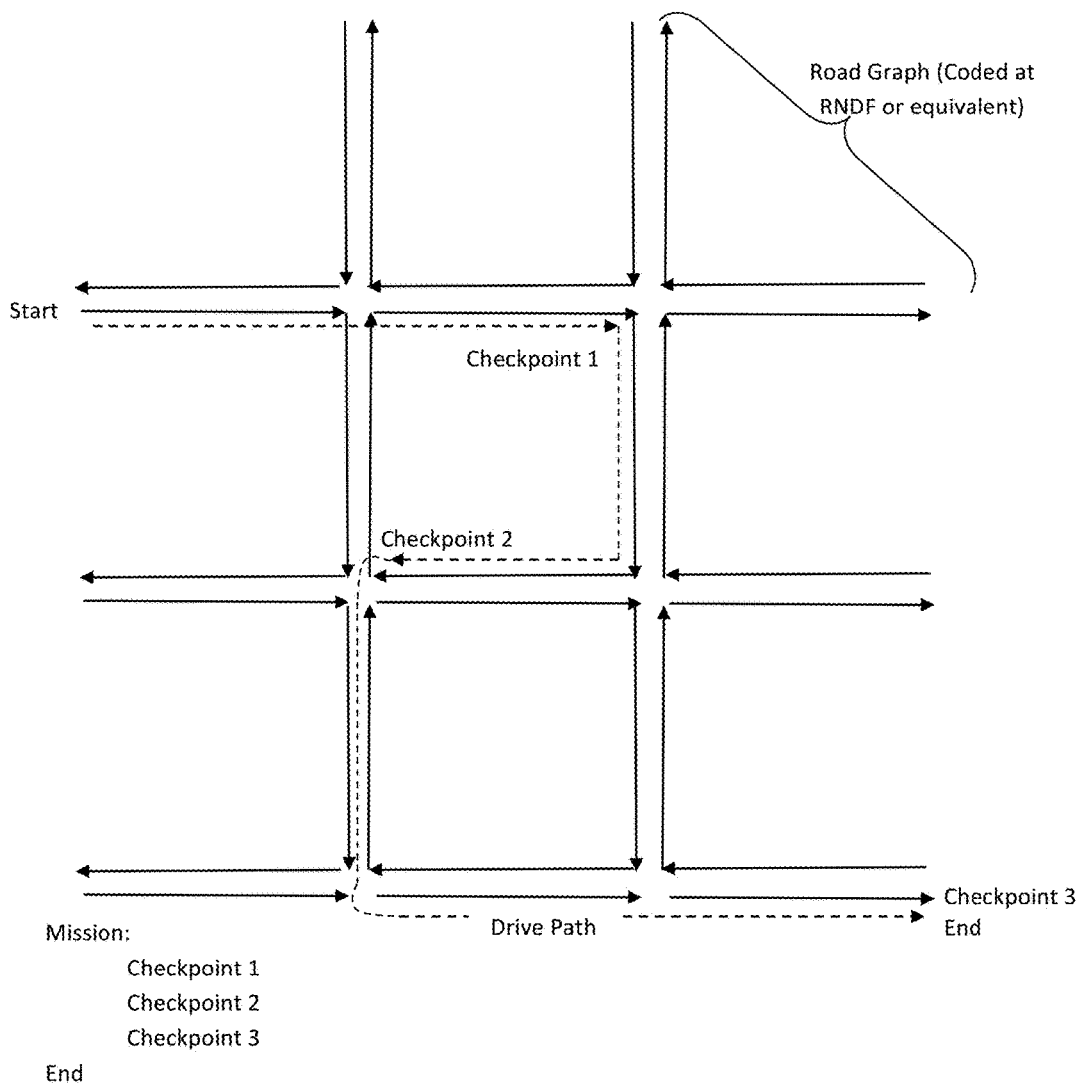
FIG. 4 illustrates how simple drive missions are typically described as a set of destination or checkpoints that the automated vehicle has to visit in the prescribed order.

The final element of the DARPA Urban Challenge derived driverless vehicle control system connects the roadgraph information base (road segments, lanes, waypoints, checkpoints, intersections, traffic flow rules like stops and speed limits, etc.) to commanded driving missions to be executed by the automated vehicle. Simple drive missions are typically described as a set of destination or checkpoints that the automated vehicle has to visit in the prescribed order (See, for example, FIG. 4). From any starting point, the vehicle invokes a planner that searches through the roadgraph for paths (which minimize some criteria like time, distance, paths preferred over particular road types, etc.) that get to the next checkpoint in list order. These paths are selected segments from the roadgraph assembled in the order to be driven. The planner then passes these plans to a driver module that executes them.

The driver module passes waypoints along the path to the next point driver. The next point driver makes smooth driving paths to the next point while observing potential obstacles. The precise smooth path to the next point is modified to the left or right so as to avoid potential collisions and if these collisions cannot be avoided, slows and eventually stops the vehicle prior to collision. Alternatively using a user interface that alerts the human driver can call for driving control to be passed from the automated system to the human driver (this only works for vehicles that have a human driver on-board—for a fully automated driverless system the equivalent is to slow and stop and pass control to a remotely located human or machine overseer who will take a corrective action including sending out a repair and maintenance crew, taking control of the remote vehicle by teleoperation, or safeing the stopped vehicle is some other way).

As described before, roadgraphs can include zones. Zones are defined as areas with specified entry and exit locations that connect to other parts of the roadgraph. In an automatic loader machine like an earthmover, a material handling forktruck, a container handler, etc., a zone will typically include a change of driving rules that allow free smooth movement between any points in the zone as long collision are avoided and designated locations and tasks to be accomplished are performed at these locations. Therefore a loading machine mission intersperses checkpoints with operations of procedures to be performed by payload handling systems at these checkpoints. Furthermore the smooth path planners, the driving module, and the next point drivers may be different from highway roadgraph systems as well. Essentially, the zone encapsulates a new alternative set of path definitions, RNDFs, driving rules, missions, etc., a new driving environment which is entered from the old and when complete returns back to the old environment.

Figure 5:
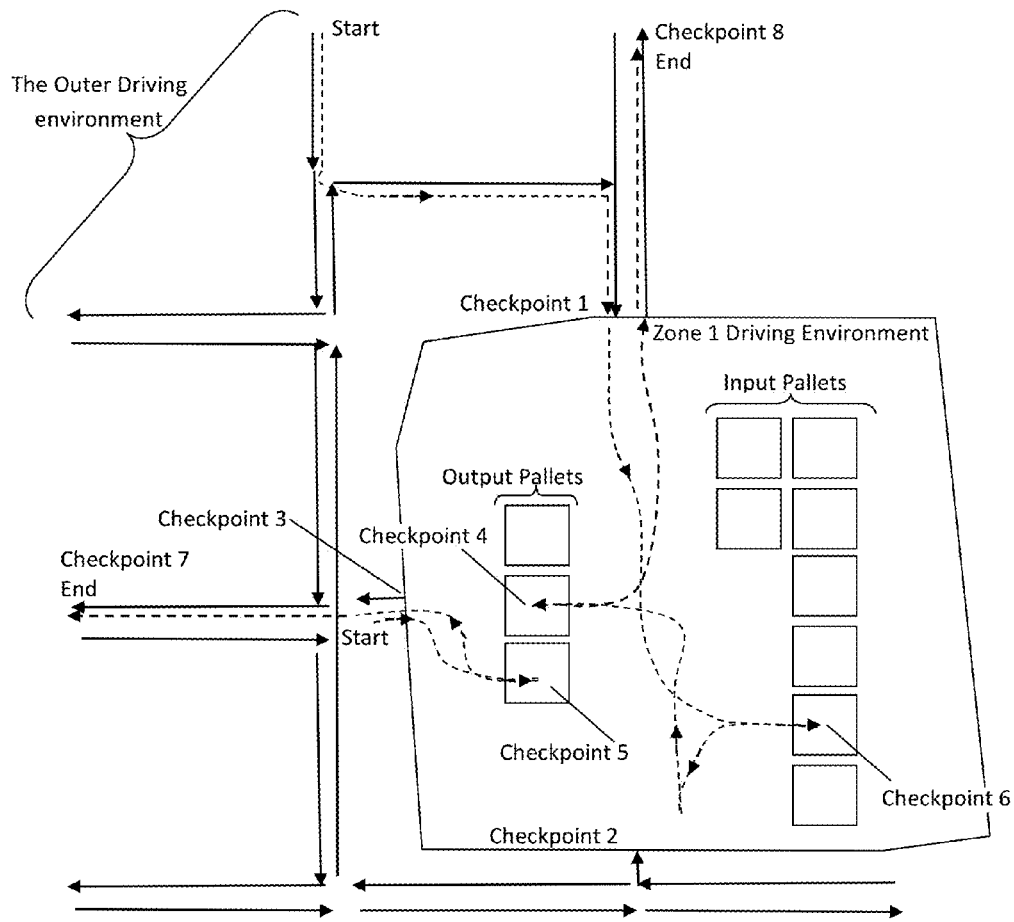
FIG. 5 shows the plan used by one loader to enter the yard (Zone 1 through Checkpoint 1), find a load on the input side (Checkpoint 6), acquire a pallet, and move this pallet to the output side (Checkpoint 4). Then a second loader enters the yard from a different zone entry point (Checkpoint 3), finds and acquires a pallet from the output side (at Checkpoint 5), and takes the load to the left hand end of mission point (Checkpoint 7)

FIG. 5 shows the plan used by one loader to enter the yard (Zone 1 through Checkpoint 1), find a load on the input side (Checkpoint 6), acquire a pallet, and move this pallet to the output side (Checkpoint 4). Then a second loader enters the yard from a different zone entry point (Checkpoint 3), finds and acquires a pallet from the output side (at Checkpoint 5), and takes the load to the left hand end of mission point (Checkpoint 7). Recoding these missions under assumption that each zone encodes an alternative driving environment they would look like:

```
Mission (First Truck):                    Mission (Second Truck):
    Checkpoint 1: Zone 1 mission 1            Checkpoint 3: Zone 1 Mission 2
    Checkpoint 8                              Checkpoint 7
End                                       End
Zone 1 Mission 1:                         Zone 1 Mission 2
    Checkpoint 1; Start                       Checkpoint 3; Start
    Checkpoint 6: Pallet Engagement           Checkpoint 5: Pallet Engagement
    Checkpoint 4: Pallet Disengagement        Checkpoint 3; End
    Checkpoint 1; End                     End
```

Figure 6:
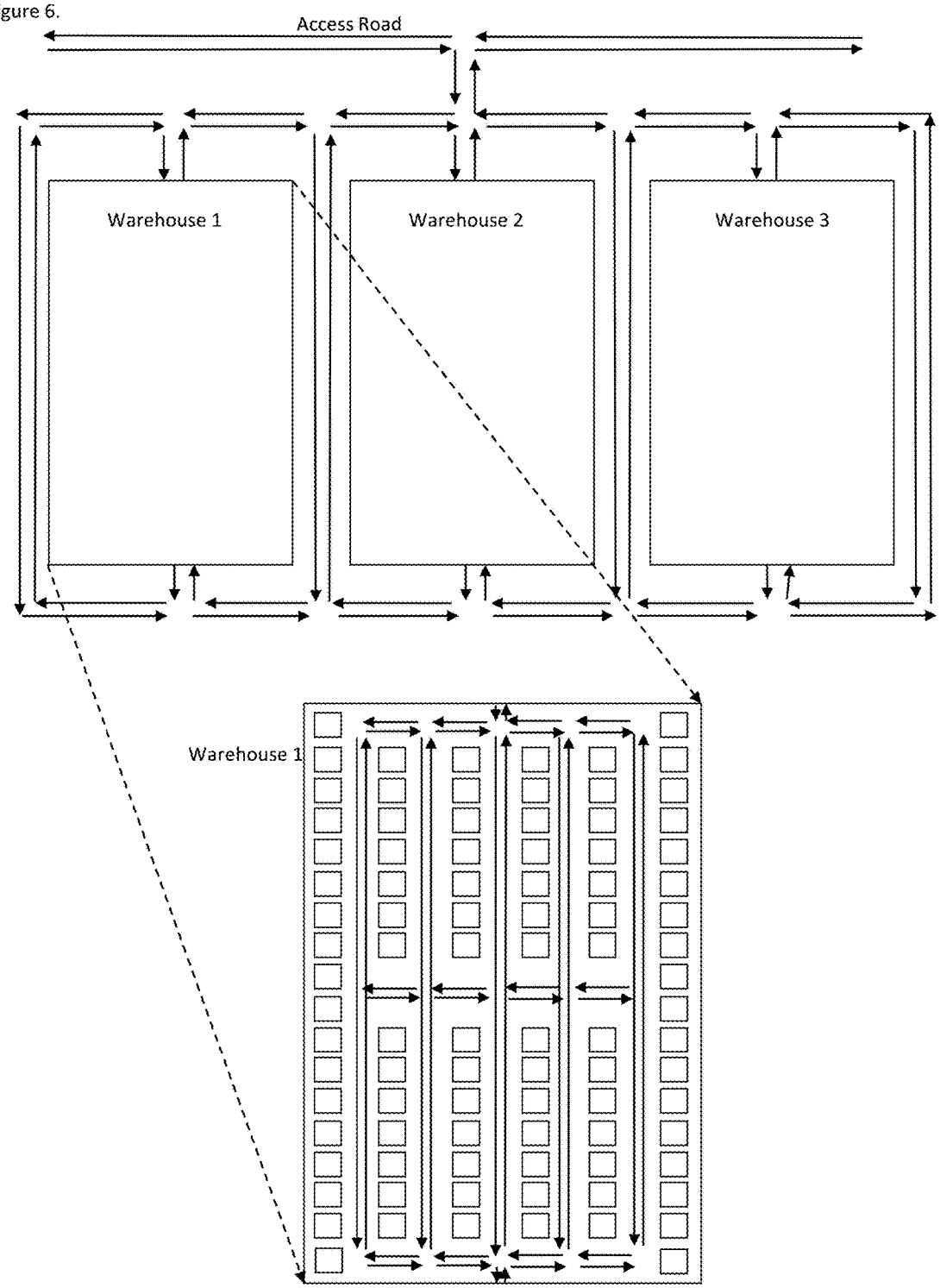
FIG. 6 shows how each warehouse of a multi-warehouse facility may be a submap of a larger map that encodes the streets interconnecting the warehouses.

FIG. 6 shows how our expanded definition of zone supporting driving environments hierarchies might be used to separate different driving environment, each defined by an embedded RNDF map the road systems embedded within each zone. As an example, FIG. 6 shows how each warehouse of a multi-warehouse facility might be a submap of a larger map that encodes the streets interconnecting the warehouses. As another example, driving in the UK and France could be encoded as a world map that embedded the maps of France and the UK as zones, each embedding country specific maps [FIG. 2]. U.S. Pat. No. 8,509,982 describes how the zone idea might be incorporated into marking of hazardous areas where a human driver should assume vehicle control. [DARPA 2007 Rules] shows how zone can be incorporated to mark areas where free driving rules should supersede or take over from normal highway roadgraph deriving rules.

This description of a hierarchy of maps and objects and properties of objects within them has been diagrammed in the figures as hierarchy readily encoded in software by tree structures or graph structures. However it is equivalent to other software encodings including decision trees, data tables and databases which associate properties to objects, lists, arrays, or any other encoding means that support cyclic graphs and traversal of same, support hierarchical abstracts or trees, and means to associate descriptive properties to objects or nodes in these graphs or trees.

Figure 7:
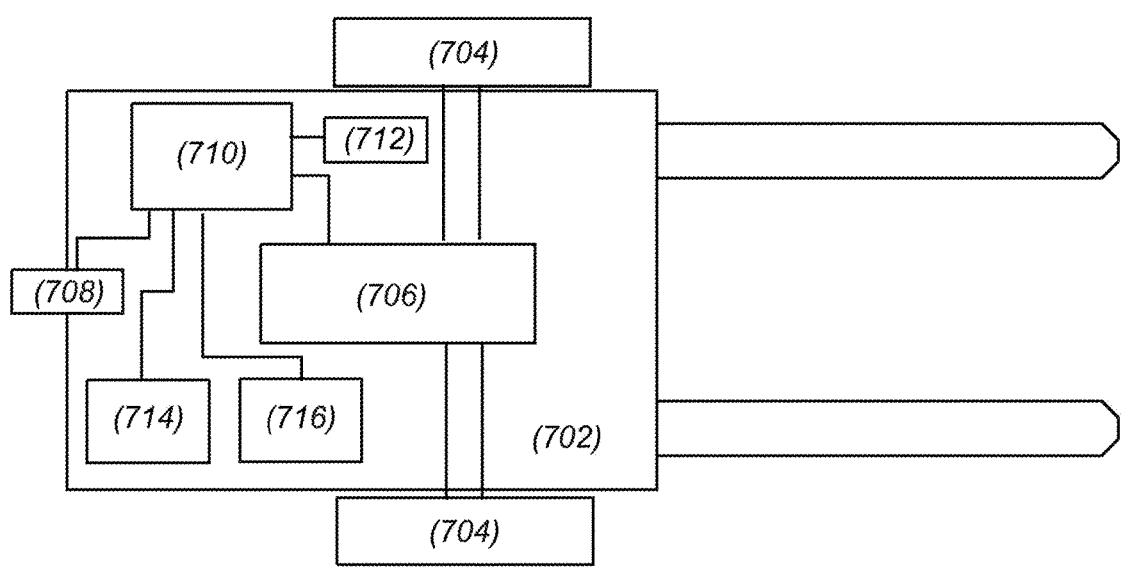
FIG. 7 is a schematic block diagram of a vehicle to which this invention is applicable.

FIG. 7 is a schematic block diagram of a vehicle to which this invention is applicable, in this case a forklift of the kind used for warehousing operations. The vehicle includes a chassis, frame or platform 702 including an engine/powertrain 706 driving wheels 704. On-board computer 710 interfaces to memory 712 storing roadgraphs, mission instructions and other information. Computer 710 controls engine/powertrain 706 and steering 708 using information gathered from localization system 714 and collision avoidance system 716,

CITED REFERENCES

DARPA 2007 Rules, http://www.grandchallenge.org/grandchallenge/rules.html, and http://archive.darpa.mil/grandchallenge/docs/Urban_Challenge_Rules_102707.pdf
DARPA 2007 Route Network File (RNDF) and Mission Data File (MDF) Formats, http://www.grandchallenge.org/grandchallenge/docs/RNDF_MDF_Formats_031407.pdf, and http://archive.darpa.mil/grandchallenge/docs/RNDF_MDF_Formats_031407.pdf
U.S. Pat. No. 8,509,982, Zone Driving, M. Montemerlo, D. Dolgov, C. Urmson Keyhole Markup Language, KML Documentation, https://en.wikipedia.org/wiki/Keyhole_Markup_Language
TIGER Products, Topologically Integrated Geographic Encoding and Referencing, http://www.census.gov/geo/maps-data/data/tiger.html

The invention claimed is:

1. An autonomous vehicle, comprising:
a powertrain driving a set of wheels, and further including steering and braking systems;
a memory for storing roadgraph information including driving rules and parameters associated with a roadgraph coordinate system;
a localization system operative to determine the location of the vehicle is relative to the roadgraph coordinate system;
an obstacle detection system;
an on-board computer interfaced to the powertrain, and steering and braking subsystems to execute commanded driving missions using the roadgraph information and localization and obstacle detection systems;
each mission being defined by a set of destinations or checkpoints that the vehicle is scheduled to visit; and
wherein the on-board computer is further operative to execute a mission commanding the autonomous vehicle to visit destinations or checkpoints in a plurality of zones, each zone being defined by a sub-roadgraph with its own set of zone-specific driving rules and parameters.

2. The autonomous vehicle of claim 1, wherein the roadgraph information is associated with on-street driving, and each zone is associated with off-street driving.

3. The autonomous vehicle of claim 1, including a mission coordinated with one or more payload operations.

4. The autonomous vehicle of claim 1, including a zone with free drive paths.

5. The autonomous vehicle of claim 1, including a mission with loading and unloading zones to pick up payloads and place them down.

6. The autonomous vehicle of claim 1, including a mission that takes the vehicle from zone staging or entry points to one or more points of payload acquisition or placement.

7. The autonomous vehicle of claim 1, wherein one or more roadgraphs are embedded within a zone, thereby inheriting the driving rules and parameters specific to that zone.

8. The autonomous vehicle of claim 1, wherein the localization system includes GPS for latitude and longitude localization and visual sensing of environmental structures external to the vehicle.

9. The autonomous vehicle of claim 1, wherein the localization system includes barcode location markers or other machine-readable codes for indoor localization.

10. The autonomous vehicle of claim 1, including zones that define driving hierarchies used to separate different driving environments, each defined by an embedded Route Network Data File (RNDF) map the road systems embedded within each zone.

11. The autonomous vehicle of claim 1, wherein the vehicle is a warehousing vehicle.

12. The autonomous vehicle of claim 1, wherein the vehicle is a forklift.

13. A method of maneuvering an autonomous vehicle, comprising the steps of:
receiving a mission including one or more destinations or checkpoints defined by a roadgraph;
wherein the mission traverses a plurality of zones;
wherein the mission includes a set of destinations or checkpoints that the vehicle is scheduled to visit in each zone; and
wherein each zone includes a unique set of rules and parameters that define how the autonomous vehicle is to drive within that zone.

14. The method of claim 13, including a zone with a path having one or more waypoints associated with a destination.

15. The method of claim 14, including the step of performing a particular operation at each waypoint.

16. The method of claim 15, wherein the operation includes:
the execution of a payload-specific sensor or manipulation operation; or
entry or exit of sub-zones or sub-roadgraphs with associated new rule or parameter sets that modify or replace the default rule or parameter sets.

17. The method of claim 13, wherein one or more roadgraphs are embedded within a zone, thereby inheriting the driving rules and parameters specific to that zone.

18. The method of claim 13, wherein the vehicle is a warehousing vehicle.

19. The method of claim 13, wherein the vehicle is a forklift.

* * * * *